United States Patent [19]

Ikeno et al.

[11] Patent Number: 5,268,433
[45] Date of Patent: Dec. 7, 1993

[54] SILICONE COMPOSITION AND A HIGHLY DAMPING HARDENED SILICONE MATERIAL

[75] Inventors: Masayuki Ikeno, Annaka; Hironao Fujiki, Takasaki, both of Japan

[73] Assignee: Shin-Etsu Chemical Co., Ltd., Tokyo, Japan

[21] Appl. No.: 964,265

[22] Filed: Oct. 21, 1992

[30] Foreign Application Priority Data

Oct. 21, 1991 [JP] Japan .................................. 3-302289

[51] Int. Cl.$^5$ .......................................... C08F 283/00
[52] U.S. Cl. .................................. 525/478; 528/15
[58] Field of Search ................................. 528/15, 478

[56] References Cited

U.S. PATENT DOCUMENTS

| | | | |
|---|---|---|---|
| 4,239,867 | 12/1980 | Legrow et al. | 525/478 |
| 4,374,967 | 2/1983 | Brown et al. | 528/15 |
| 5,077,369 | 12/1991 | de Montigny et al. | 528/15 |

*Primary Examiner*—Melvyn I. Marquis
*Attorney, Agent, or Firm*—Oblon, Spivak, McClelland, Maier & Neustadt

[57] ABSTRACT

A silicone composition comprising, as the base component to provide crosslinking points, an organopolysiloxane copolymer comprising diorganosiloxane blocks and trifunctional arylsiloxane blocks and the molecular ends of which are terminated with alkenylsiloxy units. This base component is combined with an organohydrogenpolysiloxane and an addition reaction catalyst. This silicone composition can be hardened to produce a highly elastic and damping material which makes an ideal damping and earthquake-resistant structure.

12 Claims, No Drawings

SILICONE COMPOSITION AND A HIGHLY DAMPING HARDENED SILICONE MATERIAL

FIELD OF THE INVENTION

The present invention relates to a silicone composition having high elasticity and a high damping coefficient and to a hardened material having high elasticity and a high damping coefficient.

BACKGROUND OF THE INVENTION

Silicone oils and silicone gels have high damping and shock absorbing characteristics and thus have been used as materials to absorb shocks and vibrations. However, the known highly damping silicone materials are so fluid and flexible, that they cannot maintain their integrity and have to be placed in containers or wrappers to avoid flow or excessive deformation. As such, there remains a need for a silicone composition which has high elasticity and a high damping coefficient, without undergoing excessive deformation or flow.

SUMMARY OF THE INVENTION

Accordingly, one object of this invention is to provide a novel silicone composition having high elasticity and a high damping coefficient, which can be used without a container or a wrapper.

It is another object of the present invention to provide a silicone composition produced by mixing an organopolysiloxane copolymer with an organohydrogenpolysiloxane (containing at least two hydrogens on the average which are bonded to hydrogen) and an addition reaction catalyst. The organopolysiloxane copolymer is produced by dissolving a chloro-terminated diorganopolysiloxane and a tri-chloro,mono-arylsilane in an organic solvent to form a solution. This solution is then added to an organic solution containing sufficient dispersed water to effect hydrolysis of the chloro substituents to yield a hydrolysis product. This hydrolysis product is then reacted with a mono-chloro,mono-alkenyl, dialkylsilane to yield the organopolysiloxane copolymer.

It is another object of this invention to provide a novel silicone composition which can be hardened to produce a material which has high elasticity and a high damping coefficient and which can be used without a container or a wrapper.

The above objects of the invention are achieved by employing a copolymer comprising diorganosiloxane units and trifunctional aryl siloxane units and having on or more molecular ends terminated with an alkenyl group, as the base component for an organopolysiloxane composition. This base composition is then formulated with an organohydrogenpolysiloxane and an addition reaction catalyst to yield the organopolysiloxane composition. This organopolysiloxane composition hardens as it undergoes addition reaction.

According to the invention, there is provided a highly damping silicone composition comprising:
(A) an organopolysiloxane copolymer having siloxane blocks (a) of the formula:

  (1)

wherein R is a substituted or unsubstituted monovalent hydrocarbon group having 1-10 carbons and containing no unsaturated aliphatic substituents, and n is an integer of 3-150;
trifunctional aryl siloxane blocks (b) of the average unit formula $$R^1SiO_{3/2} \quad (2)$$

and having 3-150 silicon atoms, wherein $R^1$ is either a substituted or unsubstituted aryl or alkaryl having 6-12 carbons; and
having at least one molecular end capped with a terminal unit (c) of the formula:

$$R^2R^3{}_2SiO_{\frac{1}{2}} \quad (3)$$

wherein $R^2$ is an alkenyl group and $R^3$ is a substituted or unsubstituted monovalent hydrocarbon group having 1-10 carbons and containing no unsaturated aliphatic substituents;
(B) an organohydrogenpolysiloxane having at least two hydrogens on the average which are bonded to silicon; and
(C) an addition reaction catalyst;
wherein said organohydrogenpolysiloxane (B) is present in such an amount that for every equivalent of an alkenyl group in component (A) there are 0.4-4.0 equivalents of hydrogen bonded to silicon.

DETAILED DESCRIPTION OF THE PREFERRED EMBODIMENTS

A more complete appreciation of the invention and many of the attendant advantages thereof will be readily obtained as the same become better understood by reference to the following detailed description of the preferred embodiments.

Organopolysiloxane Copolymer (A)

The organopolysiloxane copolymer (A) used as the base component in the silicone composition of the present invention has siloxane blocks (a) of formula (1), trifunctional aryl siloxane blocks (b) of average unit formula (2), and at least one molecular end capped with a unit (c) of formula (3).

Siloxane blocks (a) within the organopolysiloxane copolymer (A) render elastic the hardened silicone material obtained by curing the silicone composition of the present invention.

With respect to formula (1) representing siloxane blocks (a), examples of the substituted or unsubstituted monovalent hydrocarbon group R, which has 1-10 carbons and contains no unsaturated aliphatic substituents, include: alkyls such as methyl, ethyl, propyl, butyl, hexyl and octyl; cycloalkyls such as cycloheptyl and cyclohexyl; aryls, such as, phenyl, naphthyl, tolyl and xylyl; and aralkyls, such as, benzyl, phenylethyl and phenylpropyl. In any of the foregoing groups, one or more hydrogens may be substituted with a halogen atom, such as, chlorine, fluorine and bromine; cyano; halogenated hydrocarbon, such as, chloromethyl, trifluoropropyl, chlorophenyl and difluorophenyl; or cyanoalkyl, such as, β-cyanoethyl, γ-cyanopropyl and β-cyanopropyl, respectively. In a preferred embodiment of the present invention, R is methyl. Additionally, the integer n, which represents the polymerization degree of, is 3-150, preferably 10-50.

It suffices if there is at least one siloxane block (a) in the organopolysiloxane copolymer (A), but it is preferable that the siloxane block (a) accounts for 20–60 wt %, or more preferably 30–50 wt %, of the organopolysiloxane copolymer (A). If the content of siloxane block (a) is too small, upon curing the resulting hardened silicone material will have poor elasticity; on the other hand, if the content is too large, the hardened silicone material will have an unsatisfactory damping coefficient.

Trifunctional aryl siloxane block (b) renders the resulting hardened silicone material highly damping. The damping characteristic is expressed in terms of the loss factor tan δ, −the greater the value of tan δ, the lower the transmission of vibration. Such materials are useful as a good earthquake-resistant rubber.

Trifunctional aryl siloxane block (b) is represented by average unit formula (2) and has 3–150 silicon atoms, preferably 5–50 silicon atoms. In average unit formula (2), $R^1$ is either a substituted or unsubstituted aryl or alkaryl of 6–12 carbons. In the alkyl or alkaryl groups, one or more hydrogens may be substituted with a halogen atom, such as, chlorine, fluorine and bromine; or cyano; thereby forming halogenated hydrocarbons, such as, chloromethyl, trifluoropropyl, chlorophenyl and difluorophenyl; or cyanoalkyls, such as, β-cyanoethyl, γ-cyanopropyl and β-cyanopropyl, respectively. Examples include phenyl, tolyl, xylyl, ethylphenyl, chlorophenyl, bromophenyl, cyanophenyl, 4-methylphenyl and 2,4-diethylphenyl. The preferred species for $R^1$ is phenyl.

It suffices if there is at least one trifunctional aryl siloxane block (b) in the organopolysiloxane copolymer (A), but it is preferred that siloxane block (b) accounts for 30–80 wt %, more preferably 40–60 wt %, of the organopolysiloxane copolymer (A). If the content of siloxane block (b) is too small, the resulting hardened material will have an unsatisfactory damping coefficient; on the other hand, if the content is too large, the hardened material have poor elasticity.

Organopolysiloxane copolymer (A) having siloxane block (a) and trifunctional aryl siloxane (b) has at least one of its molecular ends capped with unit (c) of formula (3); this terminal unit (c) provides organopolysiloxane copolymer (A) with crosslinking points and, thus, determines the crosslinking density in the hardened silicone material.

In formula (3) representing terminal unit (c), examples of the alkenyl group $R^2$ are alkenyl groups having 2–8 carbon atoms, which include vinyl, allyl, propenyl, butenyl and hexenyl. The substituted or unsubstituted monovalent hydrocarbon group $R^3$ is a substituted or unsubstituted monovalent hydrocarbon group having 1–10 carbons and containing no unsaturated aliphatic substituents. These hydrocarbon groups include: alkyls such as methyl, ethyl, propyl, butyl, hexyl and octyl; cycloalkyls such as cycloheptyl and cyclohexyl; aryls, such as, phenyl, naphthyl, tolyl and xylyl; and aralkyls, such as, benzyl, phenylethyl and phenylpropyl. In any of the foregoing groups, one or more hydrogens may be substituted with a halogen atom, such as, chlorine, fluorine and bromine; or cyano; thereby forming halogenated hydrocarbons, such as, chloromethyl, trifluoropropyl, chlorophenyl and difluorophenyl; or cyanoalkyls, such as, β-cyanoethyl, γ-cyanopropyl and β-cyanopropyl, respectively.

Generally speaking, it is preferred that terminal unit (c) is present as 1–10 wt % of organopolysiloxane copolymer (A).

Organopolysiloxane copolymer (A) of the present invention can be prepared by means of various known procedures. For example, into an organic solvent such as toluene can be dissolved a chloro-terminated diorganopolysiloxane having a polymerization degree of 3–150, phenyltrichlorosilane and, if necessary, a bifunctional silane, such as, methylphenyldichlorosilane in a molar ratio corresponding to that of the desired copolymer (A) This solution is then added to a toluene solution in which water is extensively dispersed, to effect hydrolysis. The product of the hydrolysis is then reacted with dimethylvinylchlorosilane to introduce terminal unit (c) represented by formula (3) and, as a result, organopolysiloxane copolymer (A) is produced.

(B) Organohydrogenpolysiloxane

Component (B), the organohydrogenpolysiloxane, functions as a crosslinking agent, for the hydrogen atoms bonded to the silicon atoms in this polysiloxane molecule participate in an addition reaction with the alkenyls of organopolysiloxane copolymer (A) to form a hardened silicone product. The average number of hydrogen atoms bonded to silicon atoms in each molecule of the organohydrogenpolysiloxane is not smaller than two, and these hydrogen atoms may be bonded to either a silicon of a terminal group or a silicon atom located internally in the molecular chain.

Examples of suitable organohydrogenpolysiloxanes include those represented by the average compositional formula:

$$R^4{}_aH_bSiO_{(4-a-b)/2} \qquad (4)$$

wherein $R^4$ is a substituted or unsubstituted monovalent hydrocarbon group having 1–10 carbons and containing no unsaturated aliphatic substituents and a and b are numbers such that $0<a\leq 3$, $0<b\leq 2$, and $0<a+b<4$. These hydrocarbon groups include: alkyls such as methyl, ethyl, propyl, butyl, hexyl and octyl; cycloalkyls such as cycloheptyl and cyclohexyl; aryls, such as, phenyl, naphthyl, tolyl and xylyl; and aralkyls, such as, benzyl, phenylethyl and phenylpropyl. In any of the foregoing groups, one or more hydrogens may be substituted with a halogen atom, such as, chlorine, fluorine and bromine; or cyano; thereby forming halogenated hydrocarbons, such as, chloromethyl, trifluoropropyl, chlorophenyl and difluorophenyl; or cyanoalkyls, such as, β-cyanoethyl, γ-cyanopropyl and β-cyanopropyl, respectively. The organohydrogenpolysiloxane represented by this average compositional formula has as a siloxane skeleton either a linear chain, a cyclic chain, a branched chain, or a reticular structure. Although it is not an essential requirement, the viscosity of this organohydrogenpolysiloxane at 25° C. is preferably 1000 cP or lower to aid in synthesis and processing.

Organohydrogenpolysiloxane (B) is compounded with organopolysiloxane copolymer (A) in an amount sufficient to provide 0.4–4.0, preferably 0.8–2.0. equivalents of hydrogen directly bonded to silicone per equivalent of alkenyl in organopolysiloxane copolymer (A).

(C) Addition Reaction Catalyst

In the present invention, the addition reaction catalyst component (C), is employed to promote the addition reaction between the alkenyl groups in the component (A) and the SiH groups in component (B). This addition reaction catalyst may be any known catalyst that promotes an addition reaction; examples include chloroplatinic acid, an alcohol-modified solution of chloroplatinic acid, a coordination compound consisting of chloroplatinic acid and either olefins or vinylsiloxanes, tetrakis (triphenylphosphine) palladium, and chlorotris (triphenylphosphine) rhodium. In the present invention, those catalysts containing platinum are preferred.

The addition reaction catalyst is present in a range of 0.1–1000 ppm relative to the sum of components (A) and (B).

Other compounding ingredients

The silicone composition of the present invention may further comprise various compounding ingredients so long as such compounding ingredients do not degrade the high elasticity and high damping characteristics of the hardened silicone material. Suitable compounding ingredients include inorganic fillers, such as, fumed silica, silica aerosol, precipitated silica, ground silica, diatomaceous earth, iron oxide, alumina, zinc oxide, titanium oxide, calcium carbonate, magnesium carbonate, zinc carbonate and carbon black. Such materials, when added in appropriate amounts, can tailor the mechanical strength of the resulting hardened silicone material. Of course, it is also possible to use hollow inorganic fillers, hollow organic fillers, organosilicon resin and spherical rubber fillers. Additionally, it is possible to control the hardening reaction by adding various reaction controlling agents, such as, polymethylvinyl siloxane cyclic compounds, acetylenic compounds, and organic phosphorus compounds.

Silicone Composition

The silicone composition of the present invention is easily formulated by uniformly mixing the above components together.

The resulting composition will harden promptly when heated at a temperature of 60°–150° C., for a period of 30–120 minutes, to produce a hardened silicone material. This hardened material exhibits not only a high elasticity but also a high damping coefficient, and therefore it is extremely useful in making a good earthquake-resistant rubber.

The silicone composition of the present invention can be produced by mixing an organopolysiloxane copolymer with an organohydrogenpolysiloxane (containing at least two hydrogens on the average which are bonded to hydrogen) and an addition reaction catalyst, wherein the organopolysiloxane copolymer is produced by a process comprising the steps of:

dissolving a chloro-terminated diorganopolysiloxane, having a polymerization degree of 3–150 and in which the organo substituents are substituted or unsubstituted monovalent hydrocarbon groups having 1–10 carbons and contain no unsaturated aliphatic substituents, and a tri-chloro,mono-arylsilane, in which the aryl substituent is a substituted or unsubstituted aryl or alkaryl having 6–12 carbons, in an organic solvent to form a solution;

adding this solution to an organic solution containing sufficient dispersed water to effect hydrolysis of the chloro substituents and to yield a hydrolysis product; and reacting the hydrolysis product with a mono-chloro,-mono-alkenyldiorganosilane, in which the organo substituents are substituted or unsubstituted monovalent hydrocarbon groups having 1–10 carbons and contain no unsaturated aliphatic substituents, to yield the organopolysiloxane copolymer. In such a composition, the organohydrogenpolysiloxane is present in an amount such that the ratio of equivalents of silicon-bonded hydrogen to equivalents of alkenyl in organopolysiloxane copolymer is 0.4–4.0, preferably 0.8–2.0.

The resulting composition will harden promptly when heated at a temperature of 60°–150° C., for a period of 30–120 minutes, to produce a hardened silicone material. This hardened material exhibits not only a high elasticity but also a high damping coefficient, and therefore it is extremely useful in making a good earthquake-resistant rubber.

Other features of the invention will become apparent in the course of the following descriptions of exemplary embodiments which are given for illustration of the invention and are not intended to be limiting thereof.

EXAMPLES

Manufacture of organopolysiloxane copolymer (A)

Synthesis Example 1

A solution was prepared by mixing:
100 grams of chloro-terminated dimethylpolysiloxane having an average polymerization degree of 35,
148 grams of phenyltrichlorosiloxane,
14.7 grams of phenylmethyldichlorosilane, and
200 grams of toluene.

This chlorosilane solution, while stirring, was added dropwise to a solution of 43 grams of toluene dispersed in 850 grams of water. During this addition, the reaction temperature increased from 20° C. to 50° C.

After the addition, stirring is continued for one additional hour. Stirring was then stopped and the reaction mixture was allowed to separate into an acidic water layer and a siloxane layer and the water layer was removed. The siloxane layer was washed with water until it became neutral; as indicated by litmus paper; then 30 grams of sodium sulfate was added and the mixture was stirred for two hours to facilitate dehydration. After the sodium sulfate is filtered, 20 grams of dimethylvinylchlorosilane and 40 grams of tetramethyldivinyldisilazane were added to the siloxane layer, and this mixture was heated to 50° C. for two hours. After removing the amine hydrochloride produced as a by-product by washing with water, toluene was stripped from the reaction mixture; as a result, organopolysiloxane copolymer (A-1) having molecular ends terminated with dimethylvinyl siloxane was obtained. The formulae and contents of the constituent blocks (a), (b), terminal unit (c) and other constituent units of this copolymer (A-1) are shown in Table 1. In this table, Ph designates the phenyl group.

TABLE 1

| Co-polymer No. | Block (a) | Constituent Unit of Block (b) | Terminal Unit (c) | Other Constituent Units |
|---|---|---|---|---|
| (A-1) | CH$_3$<br>\|<br>$(\text{SiO})_{35}$<br>\|<br>CH$_3$ | PhSiO$_{3/2}$ | Dimethyl-vinyl Siloxane | (CH$_3$)PhSiO$_{2/2}$ |
|  | (47.3%) | (44.0%) | (3.6%) | (5.1%) |
| (A-2) | CH$_3$<br>\|<br>$(\text{SiO})_{20}$<br>\|<br>CH$_3$ | PhSiO$_{3/2}$ | Dimethyl-vinyl Siloxane | (CH$_3$)PhSiO$_{2/2}$ |
|  | (53.6%) | (39.0%) | (5.3%) | (2.1%) |

TABLE 1-continued

| Co-polymer No. | Block (a) | Constituent Unit of Block (b) | Terminal Unit (c) | Other Constituent Units |
|---|---|---|---|---|
| (A-3) | $\begin{array}{c} CH_3 \\ | \\ +SiO)_{15} \\ | \\ CH_3 \end{array}$ | $PhSiO_{3/2}$ | Dimethyl-vinyl Siloxane | $(CH_3)PhSiO_{2/2}$ |
| | (52.3%) | (38.7) | (6.9%) | (2.1%) |

Synthesis Example 2

An organopolysiloxane copolymer (A-2) having molecular ends terminated with dimethylvinylsiloxane was obtained by the same procedure as in Synthesis Example 1 except that in place of the chloro-terminated dimethylpolysiloxane of average polymerization degree 35, one having an average polymerization degree of 20 was used, the dosage of the phenylmethyldichlorosilane was 5.4 grams, and the dosage of the phenyltrichlorosiloxane was 114 grams.

The formulae and contents of the constituent blocks (a), (b), terminal unit (c), and other constituent units of this copolymer (A-2) are also shown in Table 1.

Synthesis Example 3

An organopolysiloxane copolymer (A-3) having molecular ends terminated with dimethylvinyl siloxane was obtained by the same procedure as in Synthesis Example 2 except that in place of the chloro-terminated dimethylpolysiloxane having an average polymerization degree of 20, one of average polymerization degree 15 was used.

The formulae and contents of the constituent blocks (a), (b), terminal unit (c), and other constituent units of this copolymer (A-3) are also given in Table 1.

Manufacture of Silicone Compositions

One hundred parts by weight each of copolymers (A-1), (A-2) and (A-3) formulated as in Synthesis Examples 1-3 were prepared, and to each of these copolymers were added 3.2 parts by weight of the organohydrogenpolysiloxane:

$$H(CH_3)_2SiO-\underset{\underset{Ph}{|}}{\overset{\overset{Ph}{|}}{Si}}O-Si(CH_3)_2H \quad (5)$$

and 0.2 parts by weight of ethynylhexanol. Each mixture was stirred well; then, vinylsiloxane complex of chloroplatinic acid was added in such an amount that the net weight of the platinum accounted for 10 ppm of the overall weight of each resulting mixture, and this new mixture was stirred uniformly, and as the result a silicone composition was obtained in each case.

Each silicone composition was heated at 120° C. for half an how, and the resulting hardened silicone material was analyzed to determine Young's modulus and damping coefficient. The results are shown in Table 2.

TABLE 2

| Block Copolymers in Silicone Composition | Young Modulus (dyne/cm$^2$) | Damping Coefficient tan δ |
|---|---|---|
| (A-1) | $1 \times 10^8$ | 0.9 |
| (A-2) | $2.5 \times 10^8$ | 0.7 |
| (A-3) | $3 \times 10^8$ | 0.7 |

As it is seen from the content of the Table 2, the silicone compositions of the present invention are hardened to form materials which exhibit extremely high elastic moduli and damping coefficients tan δ (loss factor). Such materials are useful to make structural parts for damping and vibration isolation.

Obviously, numerous modifications and variations of the present invention are possible in light of the above teachings. It is therefore to be understood that within the scope of the amended claims, the invention may be practiced otherwise then as specifically described herein.

What is claimed as new and desired to be secured by Letters Patent of the United States is:

1. A highly damping silicone composition comprising:

(A) an organopolysiloxane copolymer having one or more siloxane blocks (a) of formula (1):

$$\begin{array}{c} R \\ | \\ +SiO)_{\overline{n}} \\ | \\ R \end{array} \quad (1)$$

wherein R is independently a substituted or unsubstituted monovalent hydrocarbon group having 1-10 carbons and containing no unsaturated aliphatic substituents, and n is an integer of 3-150;

one or more siloxane blocks (b) represented by average unit formula:

$$R^1SiO_{3/2} \quad (2)$$

and having 3-150 silicons wherein $R^1$ is either a substituted or unsubstituted aryl or alkaryl having 6-12 carbons, and having at least one molecular end capped with a terminal unit (c) of formula (3):

$$R^2R^3{}_2SiO_{\frac{1}{2}} \quad (3)$$

wherein $R^2$ is alkenyl and $R^3$ is independently a substituted or unsubstituted monovalent hydrocarbon group having 1-10 carbons and containing no unsaturated aliphatic substituents;

(B) an organohydrogenpolysiloxane having at least two hydrogens on the average which are bonded to silicon; and (C) an addition reaction catalyst promoting the addition reaction between the alkenyl groups in (A) and the Si—H groups in (B);

wherein said organohydrogenpolysiloxane (B) is present in an amount such that for every equivalent of alkenyl in component (A) there are 0.4-4.0 equivalents of hydrogen directly bonded to silicon.

2. The silicone composition of claim 1 wherein said organopolysiloxane copolymer contains 20-60% by weight of siloxane blocks (a), 30-80% by weight of siloxane blocks (b), and 1-10% by weight of terminal unit (c) relative to the total weight of said organopolysiloxane copolymer.

3. The silicone composition of claim 1 wherein said organopolysiloxane copolymer contains 30–50% by weight of siloxane blocks (a), 40–60% by weight of siloxane blocks (b), and 1–10% by weight of terminal unit (c) relative to the total weight of said organopolysiloxane copolymer.

4. A hardened silicone material comprising a silicone composition comprising;

(A) an organopolysiloxane copolymer having one or more siloxane blocks (a) of formula (1):

$$+SiO+_n \quad \text{with R above and R below} \tag{1}$$

wherein R is independently a substituted or unsubstituted monovalent hydrocarbon group having 1–10 carbons and containing no unsaturated aliphatic substituents, and is an integer of 3–150;

one or more siloxane blocks (b) represented by average unit formula:

$$R^1SiO_{3/2} \tag{2}$$

and having 3–150 silicons wherein $R^1$ is either a substituted or unsubstituted aryl or alkaryl having 6–12 carbons; and having at least one molecular end capped with a terminal unit (c) of formula (3):

$$R^2R^3{}_2SiO_{\frac{1}{2}} \tag{3}$$

wherein $R^2$ is alkenyl and $R^3$ is independently a substituted or unsubstituted monovalent hydrocarbon group having 1–10 carbons and containing no unsaturated aliphatic substituents;

(B) an organohydrogenpolysiloxane having at least two hydrogens on the average which are bonded to silicon; and (C) an addition reaction catalyst promoting the addition reaction between the alkenyl groups in (A) and the Si—H groups in (B);

wherein said organohydrogenpolysiloxane (B) is present in an amount such that for every equivalent of alkenyl in component (A) there are 0.4–4.0 equivalents of hydrogen directly bonded to silicon and wherein said silicone composition has been hardened by heating to 60°–150° C. for a period of 30–120 minutes.

5. The hardened silicone material of claim 4 wherein said organopolysiloxane copolymer contains 20–60% by weight of siloxane blocks (a), 30–80% by weight of siloxane blocks (b), and 1–10% by weight of terminal unit (c) relative to the total weight of said organopolysiloxane copolymer.

6. The hardened silicone material of claim 4 wherein said organopolysiloxane copolymer contains 30–50% by weight of siloxane blocks (a), 40–60% by weight of siloxane blocks (b), and 1–10% by weight of terminal unit (c) relative to the total weight of said organopolysiloxane copolymer.

7. A highly damping silicone composition produced by a process comprising the step of:

mixing (A) an organopolysiloxane copolymer with (B) an organohydrogenpolysiloxane containing at least two hydrogens on the average which are bonded to hydrogen and (C) an addition reaction catalyst promoting the addition reaction between the alkenyl groups in (A) and the Si—H groups in (B), wherein the organopolysiloxane copolymer (A) has one or more siloxane blocks (a) of formula (1):

$$+SiO+_n \quad \text{with R above and R below} \tag{1}$$

wherein R is independently a substituted or unsubstituted monovalent hydrocarbon group having 1–10 carbons and containing no unsaturated aliphatic substituents, and n is an integer of 3–150;

one or more siloxane blocks (b) represented by average unit formula:

$$R^1SiO_{3/2} \tag{2}$$

and having 3–150 silicons wherein $R^1$ is either a substituted or unsubstituted aryl or alkaryl having 6–12 carbons, and having at least one molecular end capped with a terminal unit (c) of formula (3):

$$R^1R^3{}_2SiO_{\frac{1}{2}} \tag{3}$$

wherein $R^2$ is alkenyl and $R^3$ is independently a substituted or unsubstituted monovalent hydrocarbon group having 1–10 carbons and containing no unsaturated aliphatic substituents and is produced by a process comprising the steps of:

dissolving a chloro-terminated diorganopolysiloxane, having an average polymerization degree of 3–150 and in which the organo substituents are substituted or unsubstituted monovalent hydrocarbon groups having 1–10 carbons and contain no unsaturated aliphatic substituents, and a tri-chloro,mono-arylsilane, in which the aryl substituent is a substituted or unsubstituted aryl or alkaryl having 6–12 carbons, in an organic solvent to form a solution;

adding this solution to an organic solution containing sufficient dispersed water to effect hydrolysis of the chloro substituents and to yield a hydrolysis product; and reacting the hydrolysis product with a mono-chloro,-mono-alkenyldiorganosilane, in which the organo substituents are substituted or unsubstituted monovalent hydrocarbon groups having 1–10 carbons and contain no unsaturated aliphatic substituents, to yield the organopolysiloxane copolymer (A), wherein said organohydrogenpolysiloxane (B) is present in an amount such that, for every equivalent of alkenyl in said organopolysiloxane copolymer, there are 0.4–4.0 equivalents of hydrogen directly bonded to silicon.

8. The silicone composition of claim 7 wherein said organopolysiloxane copolymer contains 20–60% by weight of siloxane blocks (a), 30–80% by weight of siloxane blocks (b), and 1–10% by weight of terminal unit (c) relative to the total weight of said organopolysiloxane copolymer.

9. The silicone composition of claim 7 wherein said organopolysiloxane copolymer contains 30–50% by weight of siloxane blocks (a), 40–60% by weight of siloxane blocks (b), and 1–10% by weight of terminal unit (c) relative to the total weight of said organopolysiloxane copolymer.

10. A highly damping hardened silicone material produced by a process comprising the steps of:

mixing (A) an organopolysiloxane copolymer with (B) an organohydrogenpolysiloxane containing at last two hydrogens on the average which are bonded to hydrogen and (C) an addition reaction catalyst (C) promoting the addition reaction between the alkenyl groups in (A) and the Si—H groups in (B) to form a silicone composition, and hardening said silicone composition by heating to 60°–150° C. for a period of 30–120 minutes wherein the organopolysiloxane copolymer (A) has one or more siloxane blocks (a) of formula (1):

wherein R is independently a substituted or unsubstituted monovalent hydrocarbon group having 1–10 carbons and containing no unsaturated aliphatic substituents, and n is an integer of 3–150;

one or more siloxane blocks (b) represented by average unit formula:

$$R^1 SiO_{3/2} \qquad (2)$$

and having 3–150 silicons wherein $R^1$ is either a substituted or unsubstituted aryl or alkaryl having 6–12 carbons, and having at least one molecular end capped with a terminal unit (c) of formula (3):

$$R^2 R^3{}_2 SiO_{\frac{1}{2}} \qquad (3)$$

wherein $R^2$ is alkenyl and $R^3$ is independently a substituted or unsubstituted monovalent hydrocarbon group having 1–10 carbons and containing no unsaturated aliphatic substituents and is produced by a process comprising the steps of:

dissolving a chloro-terminated diorganopolysiloxane, having a polymerization degree of 3–150 and in which the organo substituents are substituted or unsubstituted monovalent hydrocarbon groups having 1–10 carbons and containing no unsaturated aliphatic substituents, and a tri-chloro,mono-arylsilane, in which the aryl substituent is a substituted or unsubstituted aryl or alkaryl having 6–12 carbons, in an organic solvent to form a solution;

adding this solution to an organic solution containing sufficient dispersed water to effect hydrolysis of the chloro substituents and to yield a hydrolysis product; and reacting the hydrolysis product with a mono-chloro,-mono-alkenyldiorganosilane, in which the organo substituents are substituted or unsubstituted monovalent hydrocarbon groups having 1–10 carbons and containing no unsaturated aliphatic substituents, to yield the organopolysiloxane copolymer (A), wherein said organohydrogenpolysiloxane (B) is present in an amount such that, for every equivalent of alkenyl in said organopolysiloxane copolymer, there are 0.4–4.0 equivalents of hydrogen directly bonded to silicon.

11. The hardened silicone material of claim 10 wherein said organopolysiloxane copolymer contains 20–60% by weight of siloxane blocks (a), 30–80% by weight of siloxane blocks (b), and 1–10% by weight of terminal unit (c) relative to the total weight of said organopolysiloxane copolymer.

12. The hardened silicone material of claim 10 wherein said organopolysiloxane copolymer contains 30–50% by weight of siloxane blocks (a), 40–60% by weight of siloxane blocks (b), and 1–10% by weight of terminal unit (c) relative to the total weight of said organopolysiloxane copolymer.

* * * * *